United States Patent

Fletcher

Patent Number: 5,757,636
Date of Patent: May 26, 1998

[54] MULTI-PHASE INVERTERS UTILIZING DISCONTINUOUS PWM WITH DEAD BANDS

[75] Inventor: John Edward Fletcher, Largs, Scotland

[73] Assignee: PWM Drives Limited, London, England

[21] Appl. No.: 687,498

[22] PCT Filed: Dec. 6, 1994

[86] PCT No.: PCT/GB95/02845

§ 371 Date: Aug. 6, 1996

§ 102(e) Date: Aug. 6, 1996

[87] PCT Pub. No.: WO96/18234

PCT Pub. Date: Jun. 13, 1996

[30] Foreign Application Priority Data

Dec. 8, 1994 [GB] United Kingdom .................. 9424940

[51] Int. Cl.$^6$ .................................................. H02M 7/797
[52] U.S. Cl. .............................. 363/98; 363/132; 363/95
[58] Field of Search .............................. 363/34, 36, 37, 363/95, 98, 132

[56] References Cited

U.S. PATENT DOCUMENTS

| | | | |
|---|---|---|---|
| 4,259,620 | 3/1981 | Oates et al. | 363/132 |
| 4,370,702 | 1/1983 | Sluey et al. | 363/98 |
| 4,527,226 | 7/1985 | Glennon | 363/95 |
| 4,720,776 | 1/1988 | Guyeska et al. | 363/37 |
| 4,777,578 | 10/1988 | Jahns | 363/98 |
| 4,819,157 | 4/1989 | Hirose et al. | 363/98 |
| 4,978,894 | 12/1990 | Takahara | 363/36 |
| 5,047,910 | 9/1991 | Levran et al. | 363/98 |
| 5,436,819 | 7/1995 | Mikami et al. | 363/98 |
| 5,450,306 | 9/1995 | Garces et al. | 363/132 |
| 5,585,708 | 12/1996 | Richardson | 363/132 |

*Primary Examiner*—Jeffrey L. Sterrett
*Attorney, Agent, or Firm*—Young & Thompson

[57] ABSTRACT

A drive circuit for a three-plane load (7) includes an inverter bridge consisting of six bridge switches (T1 to T6), a modulation generator (6) which controls switching of the inverter bridge (4) via a pulse width modulator, in dependence on the inverter line voltage commands (Va, Vb and Vc) and sensed line currents (Ia, Ib and Ic). The pulse width modulation generator is configured such that if the commanded line voltages allow, the phase leg carrying the greater sensed, current is claimed to one of the d.c. rails, the required line voltage controlled by varying the on-to-off duty cycle of the two other bridge legs in accordance with the pulse width modulation (pwm) principle. Clamping suppresses the high frequency switching in the leg (deadbanding) and in the steady state occurs for two sixty-degree segments of the fundamental cycle. The reduction in switching losses associated with the clamping is maximized by linking the dead-band to the peaks of the leg current. However, under conditions of low power factor (both leading and lagging), the relationship between command line voltage and leg currents is such that the dead-bands cannot be coincident with the peaks of the leg currents without introducing severe distortion in the line voltages; under these conditions, the pulse width modulation generator clamps the phase leg carrying the next highest sensed current whilst still maintaining the required line voltage outputs.

10 Claims, 4 Drawing Sheets

Phase leg controlled by SB clamped to high tension rail of DL link - Deadband.   Load power factor = 0°

Phase leg controlled by SA clamped to low tension rail. Coincident with peak in line current Ia.

MULTI-PHASE INVERTERS UTILIZING DISCONTINUOUS PWM WITH DEAD BANDS

TECHNICAL FIELD

This invention relates to the generation of pulse width modulating waveforms, and is concerned more particularly, but not exclusively, with the reduction in switching losses in inverter circuits employing the pulse width modulating principle.

BACKGROUND ART

Inverter circuits employing high frequency switching devices are used in conjunction with the pulse width modulating principle to provide high quality variable frequency and variable voltage outputs. The waveforms used to modulate the pulse width of the high frequency carrier, so as to produce fundamental frequency output voltages, are typically continuous and of a sinusoidal nature such that every switching device in the inverter be switched continuously over a fundamental cycle. Discontinuous waveforms may also be used providing that the resultant output voltages are sinusoidal. The discontinuous waveforms have dead-bands where high frequency switching in the phase legs is suppressed for sections of the fundamental period and the phase connection point of the leg clamped to one of the direct current input rails. In one fundamental cycle, the total number of switching device commutations is decreased thus reducing associated switching losses. The switching loss reduction is, however, dependant upon the phase leg current flowing during the dead-band.

DISCLOSURE OF INVENTION

It is an object of the invention to provide a method of linking the dead-band regions of the discontinuous modulating waveforms to the peaks of the associated phase leg currents.

According to the invention there is provided a drive circuit for a load, the circuit comprising connection means for connection to a direct current supply, respective switching means associated with each phase of the load and connected to the connection means for supplying current to the load, sensing means for sensing the current supplied by way of the connection means and voltage control means for switching the switching means so as to supply voltage, in accordance with the required voltage, to each phase of the load, the voltage control means being operatively coupled to the current sensing means.

In one possible embodiment of the invention the switching means associated with each phase of the load comprises two switching elements connected in series, as a phase leg, and connectable at their common point to the associated load phase. The voltage control means is arranged to control the switching means such that the phase leg carrying either the largest or second largest sensed current magnitude is clamped to one of the d.c. rails and the other phase legs are pulse width modulated so as to supply the required phase voltages.

BRIEF DESCRIPTION OF DRAWINGS

In order that the invention be more fully understood, reference will now be made to the accompanying drawings, in which.

BEST MODES FOR CARRYING OUT THE INVENTION

Figure 1:
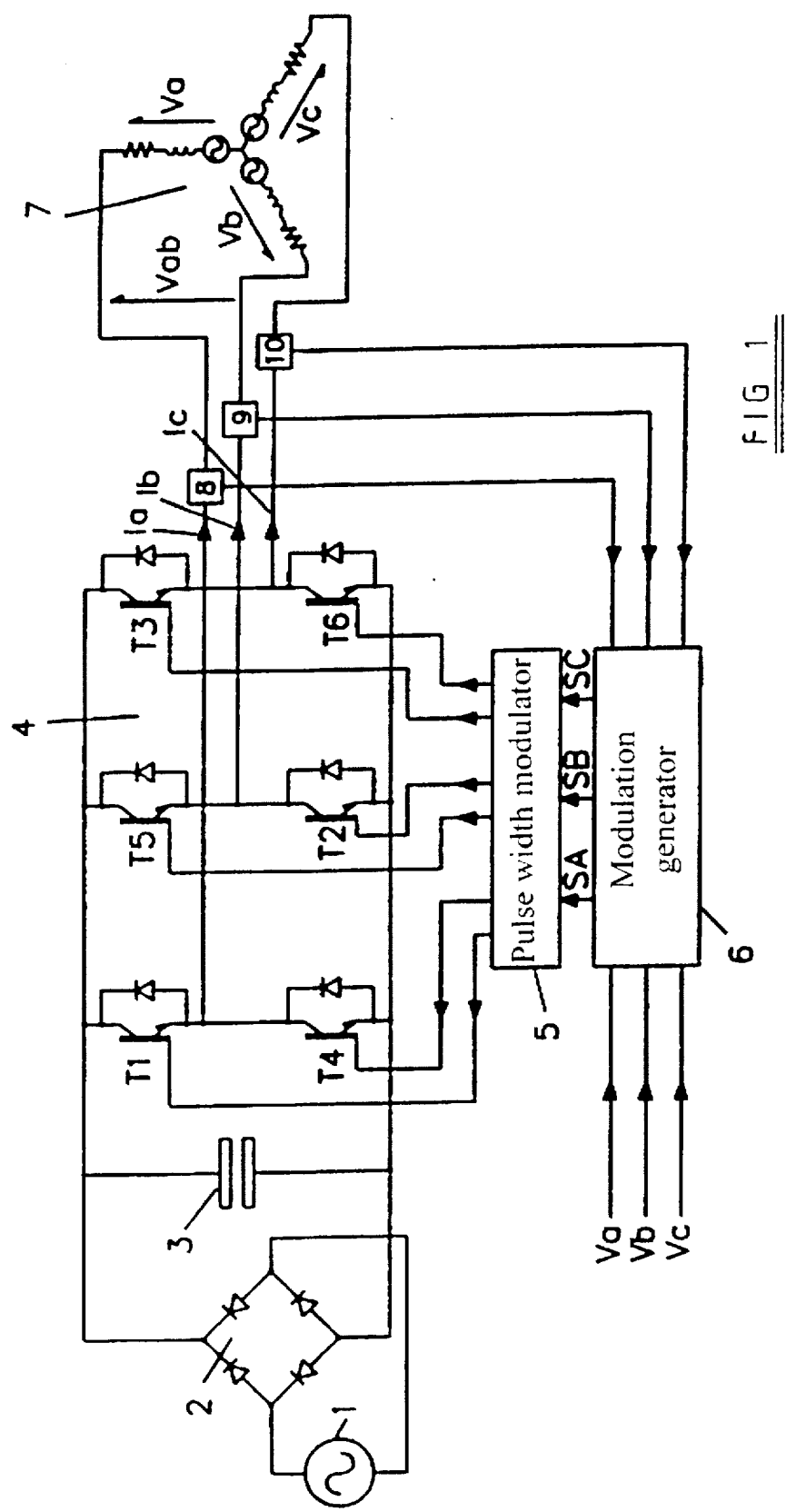
FIGS. 1 and 1a are a circuit diagram of a preferred embodiment of drive circuit in accordance with the invention for a three phase (3φ) induction motor drive.

Referring to the circuit diagram of FIG. 1 the circuit comprises an a.c. voltage supply 1, a full wave bridge rectifier 2 and a smoothing capacitor 3 which converts the a.c. voltage from the supply 1 into a d.c. voltage rail. An inverter bridge 4 consisting of six bridge switches T1 to T6 which are commutated by the pulse width modulator 5, thereby supplying the desired phase voltages, Va, Vb and Vc to the induction motor 7. The signals SA to SC control the pulse width of the high frequency carrier produced by the pulse width modulator 5. These signals, furnished by the modulation generator 6, are dependant both on the line currents, Ia, Ib and Ic sensed by 8, 9 and 10 and the desired phase voltages, Va, Vb and Vc. Each phase leg comprises a pair of switches connected in series, these pairs being (T1,T4) (T5,T2) (T3,T6). For clarity, the signals SA to SC have a modulation index between −0.5 and +0.5 such that a phase leg modulated at an index of −0.5 has the lower switching device T2 or T4 or T6, turned on for a complete switching period and an index of +0.5 holds the upper switching devices, T1 or T3 or T5, on for a complete switching period.

Figure 2:
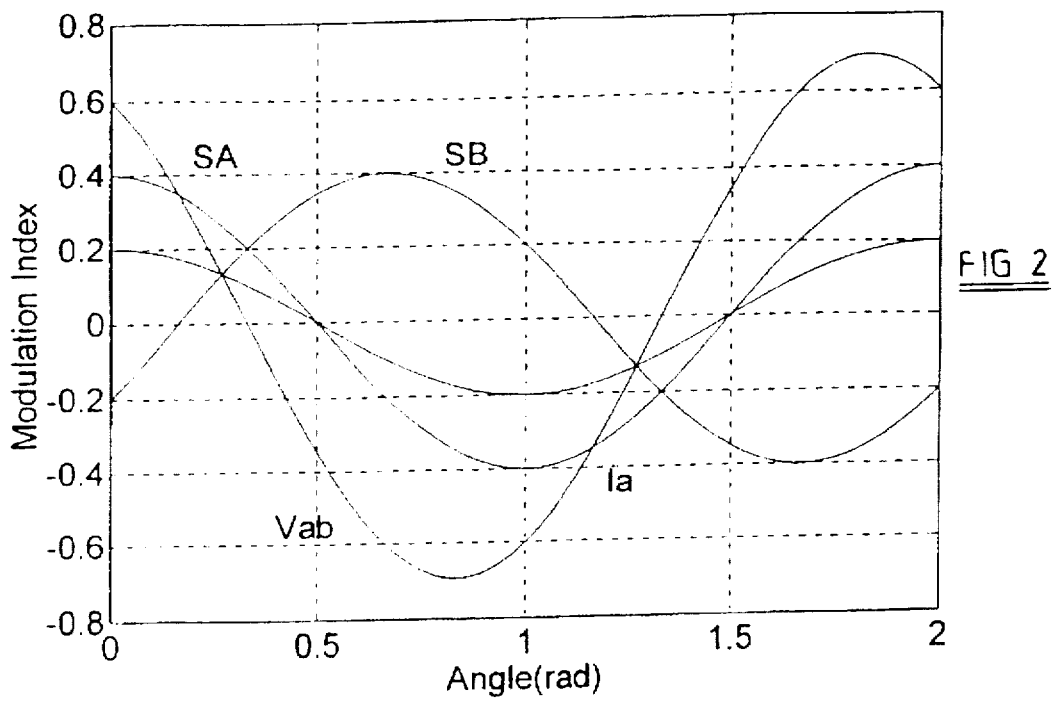
FIG. 2 shows explanatory waveforms indicating the manner of operation of the circuit shown in FIG. 1 using prior art.

In a conventional system, the modulating waveforms SA to SC are sinusoidal in nature. FIG. 2 shows typical modulating signals SA and SB to produce 3φ sinusoidal line voltages at the fundamental frequency from the inverter. The figure includes the line current, Ia, supplied under unity power factor conditions and the resultant line voltage, Vab.

In the modified scheme, at any given time, one phase leg is clamped. The truth table below maps the clamping function onto required phase voltage and sensed line current magnitudes. The required phase voltages to be applied to the load are given by Va, Vb and Vc. The quantities |Ia|, |Ib| and |Ic| are the magnitudes of the sensed line currents Ia, Ib and Ic.

|  | Hal > Hbl > Hcl | Hal > Hcl > Hbl | Hbl > Hal > Hcl | Hbl > Hcl > Hal | Hcl > Hal > Hbl | Hcl > Hbl > Hal |
| --- | --- | --- | --- | --- | --- | --- |
| Va > Vb > Vc | T1 | T1 | T1 | T6 | T6 | T6 |
| Va > Vc > Vb | T1 | T1 | T2 | T2 | T1 | T2 |
| Vb > Va > Vc | T5 | T6 | T5 | T5 | T6 | T6 |
| Vb > Vc > Va | T4 | T4 | T5 | T5 | T4 | T5 |
| Vc > Va > Vb | T2 | T3 | T2 | T2 | T3 | T3 |
| Vc > Vb > Va | T4 | T4 | T4 | T3 | T3 | T3 |

Figure 3:
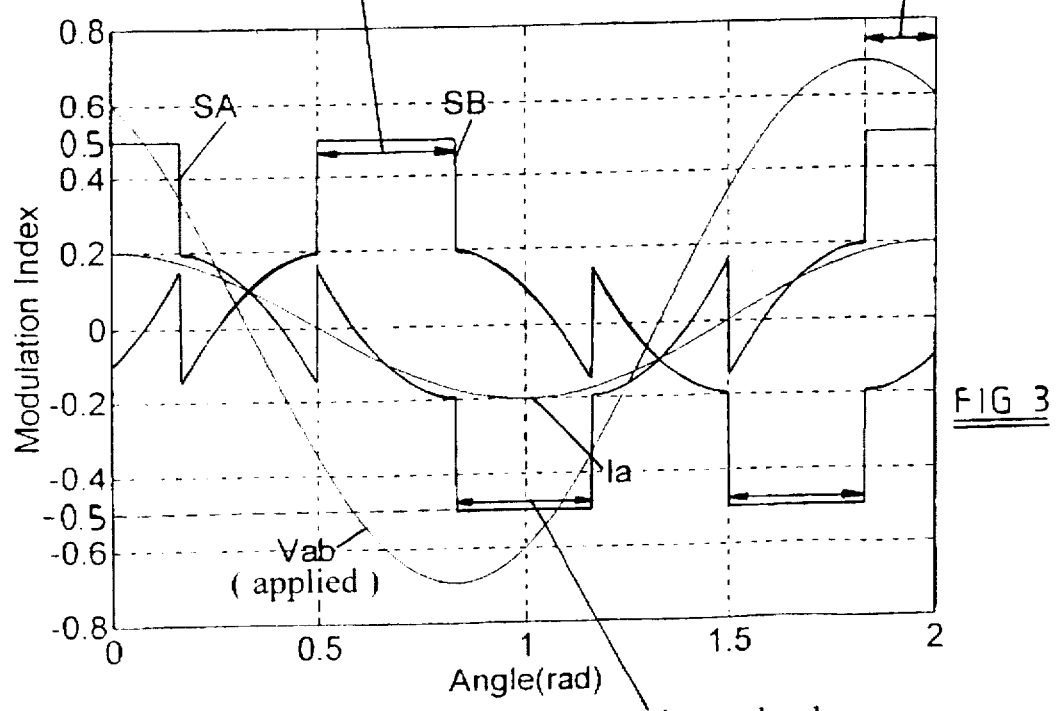
FIGS. 3, 4 and 5 show explanatory waveforms indicating, in accordance with the invention, the manner of operation of the circuit shown in FIG. 1.
Figure 4:
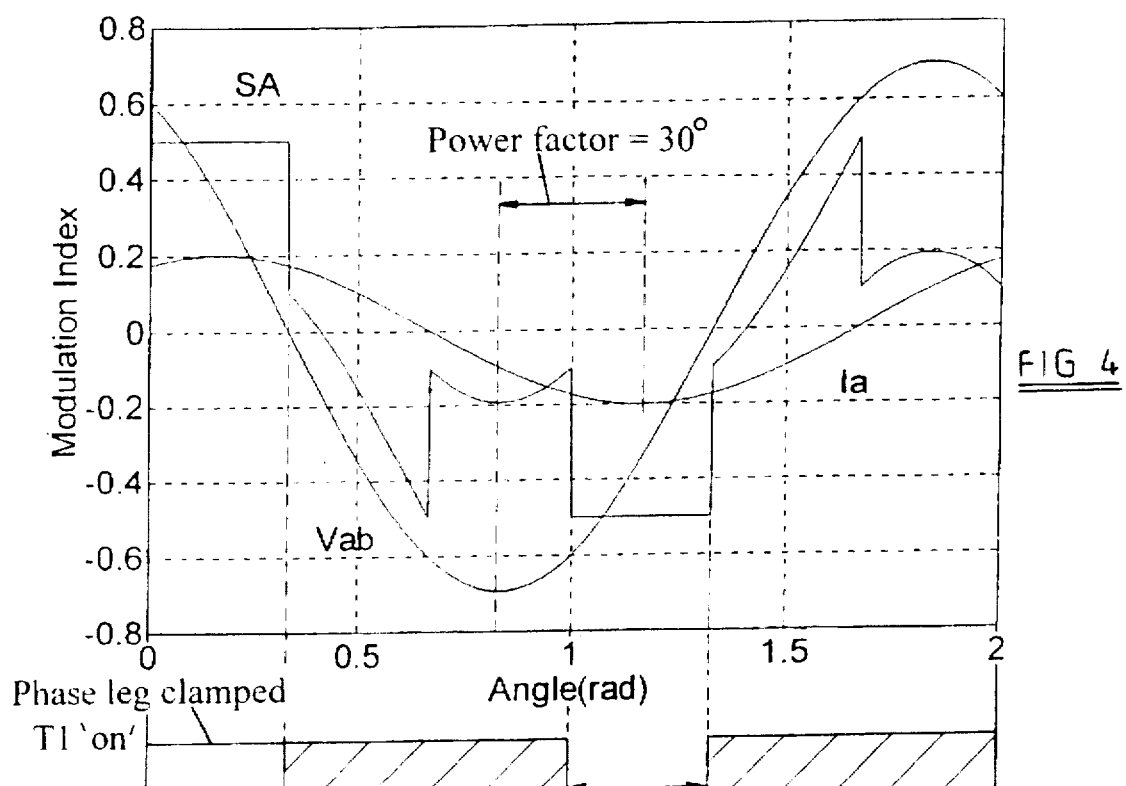
Figure 5:
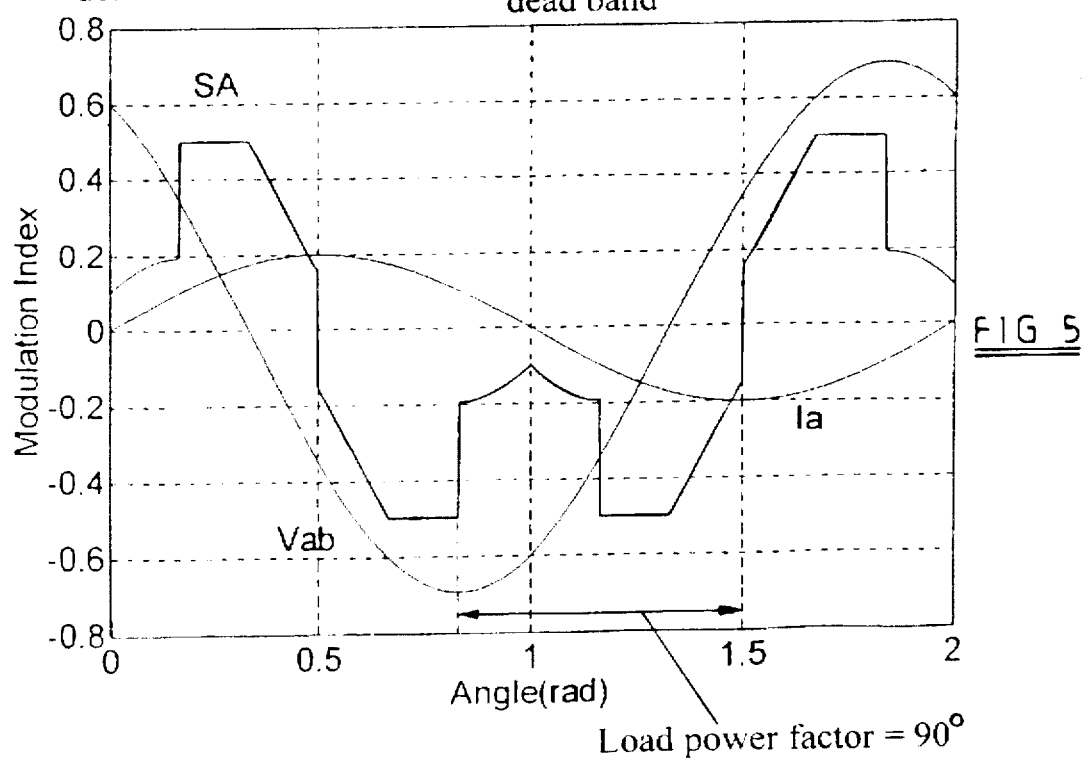

The table defines which switch is held on in the inverter 4 and thus which phase leg is clamped. The other phase legs have their switches pulse width modulated to give the required line voltages and hence phase voltages. FIG. 3 shows, according to the invention, typical modulating signals SA and SB, produced by the modulation generator 6, along with line current, Ia, and resultant line voltage, Vab, over a fundamental cycle for a unity power factor load. FIG. 4 shows operation at a lagging power factor of 0.866 and displays modulating waveform SA, line current Ia and resultant line voltage, Vab. The coincidence of dead-band with the peaks of the line current is apparent. FIG. 5 shows operation at zero lagging power factor. Under this condition, the clamping function occurs on the phase leg carrying the second highest line current magnitude to allow the required phase voltages to be produced.

Implementation of the algorithm maybe facilitated by the use of a microprocessor and be software based, or, alternatively be realised in hardware using a combination of digital and analogue technologies. Hysteresis, or positive feedback, maybe required to help avoid multiple transitions when detecting crossover points between sensed currents and between desired voltages.

Industrial Applicability

Figure 1A:
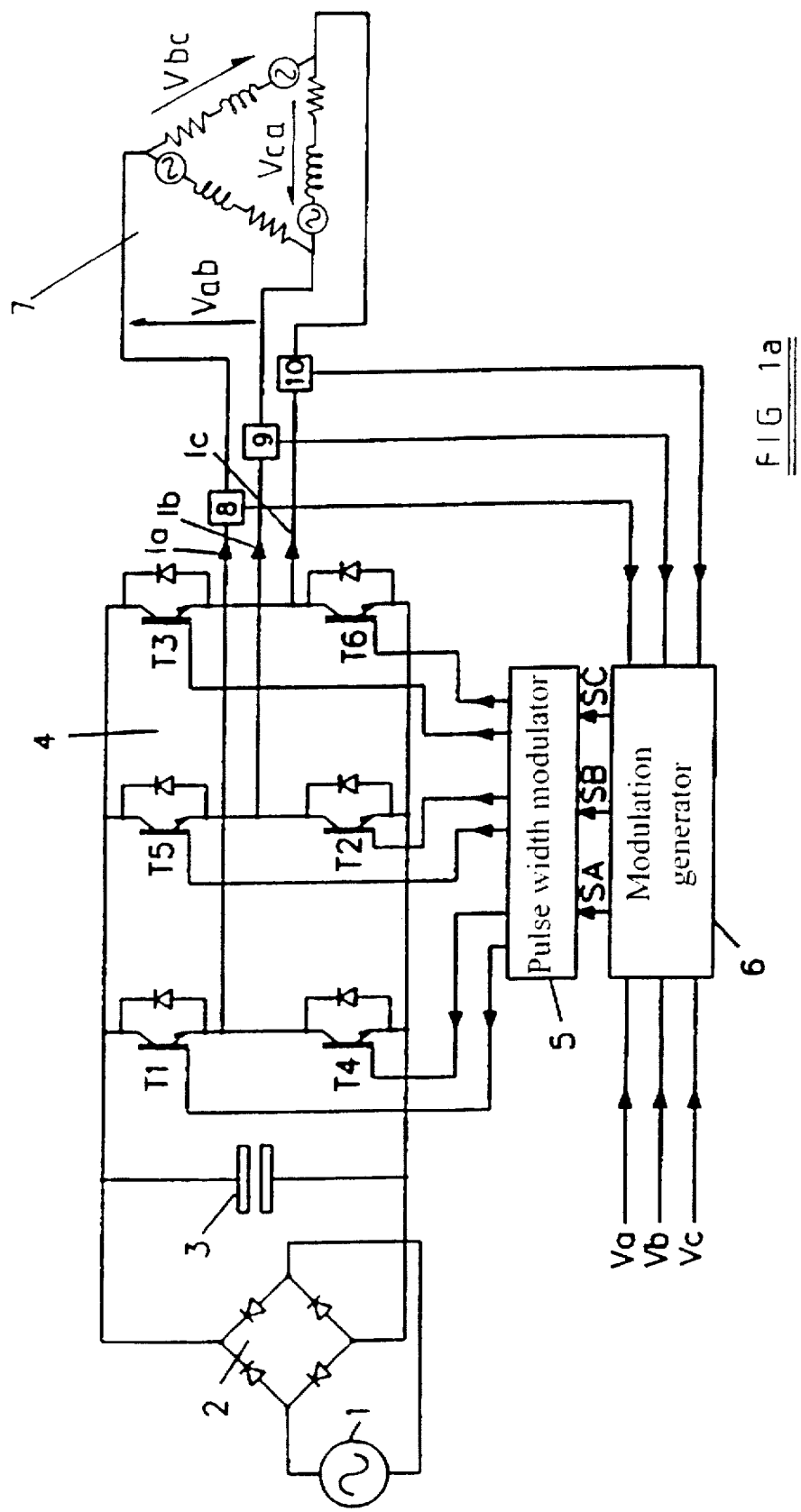

In vector control of a.c. machines there is, generally, a prerequisite for current sensing to enable control of machine phase currents and hence to orientate flux and torque producing components. Control is carried out by adjustment of applied line voltages which maybe carried out using the pulse width modulating principle. Thus all the system requirements for implementation of this scheme are provided for in a typical vector control system. FIG. 1 shows a star connected motor, if the motor or load is delta connected (such as shown in FIG. 1a) a simple transformation maybe required to obtain line currents from sensed phase current.

The scheme effectively tracks the displacement between phase voltage and line current. If the load conditions are such that power factor does not change significantly over the operating period a second possible embodiment of the invention is possible where current dependency of the modulating waveform is not required. In these conditions, the dead-bands are fixed relative to the peaks of the fundamental phase voltage. For example, if the load power factor is constant at 0.866 lagging, the dead-band regions of the modulating signals would be fixed in the positions shown in FIG. 4. This type of scheme maybe carried out in vector control situations or, alternatively, in voltage source applications were the modulating signals are obtained by stepping sequentially through a waveform stored in some form of memory.

Comparison of both schemes with that using continuous sinusoidal modulating waveforms shows that the maximum output line voltage obtainable is increased by a factor of 115.5% before overmodulation, and hence output distortion, occurs. This figure is commensurate with the increase obtained using third harmonic injection, triplen series injection and space-vector modulation schemes. Additionally, switching losses in the inverter switches T1 to T6 are halved for power factors (leading and lagging) between unity and 0.866.

I claim:

1. A drive circuit for a multi-phase load having a plurality of phase legs, the circuit comprising connection means for connection to the rails of a direct current supply, respective switching means associated with each phase leg of the load and connected to the connection means for supplying current from the supply to the load, sensing means for sensing the current supplied to the load by way of the switching means, and voltage control means connected to the switching means and operatively coupled to the sensing means for controlling switching of the switching means such that the voltage applied to the load is varied in accordance with the required voltage by connecting each of the phase legs to the two direct current rails alternately at a carrier frequency and such that one of the phase legs is clamped to one the direct current rails during a first clamping period and another of the phase legs is clamped to the other direct current rail during a second clamping period with the clamping periods corresponding to a plurality of switching periods of the carrier frequency, the clamping of the phase legs being controlled in dependence on the current sensed by the sensing means in order to limit the amount of switching of the switching means.

2. A drive circuit according to claim 1, wherein the voltage control means is arranged to control switching of the switching means such that during each clamping period, the phase leg carrying the current of largest magnitude is clamped to one of the direct current rails.

3. A drive circuit according to claim 1, wherein the voltage control means is arranged to control switching of the switching means such that, during each clamping period, the phase leg carrying the current of second largest magnitude is clamped to one of the direct current rails.

4. A drive circuit according to claim 1, wherein the voltage control means is arranged to control switching of the switching means for each phase leg of the load such that the part of the switching cycle for which the phase leg is clamped to one of the direct current rails is substantially coincident with a peak in the current supplied to the phase leg.

5. A drive circuit according to claim 1, wherein the current sensing means is arranged to sense the current supplied to each phase leg of the load.

6. A drive circuit according to claim 1, wherein the phase legs of the load are in a delta configuration.

7. A drive circuit according to claim 1, wherein the load is a source capable of regenerating the direct current supply.

8. A drive circuit according to claim 1, wherein the phase legs of the load are in a star configuration.

9. A drive circuit according to claim 1, wherein the voltage control means is arranged to control switching of the switching means such that the clamping periods are in a fixed relationship to the voltage applied to the load.

10. A drive circuit according to claim 1, wherein the voltage control means is arranged to control switching of the switching means by pulse width modulation at the carrier frequency to produce the voltage for each phase leg of the load except when the phase leg is clamped to one of the direct current rails.

* * * * *